Figure 1:
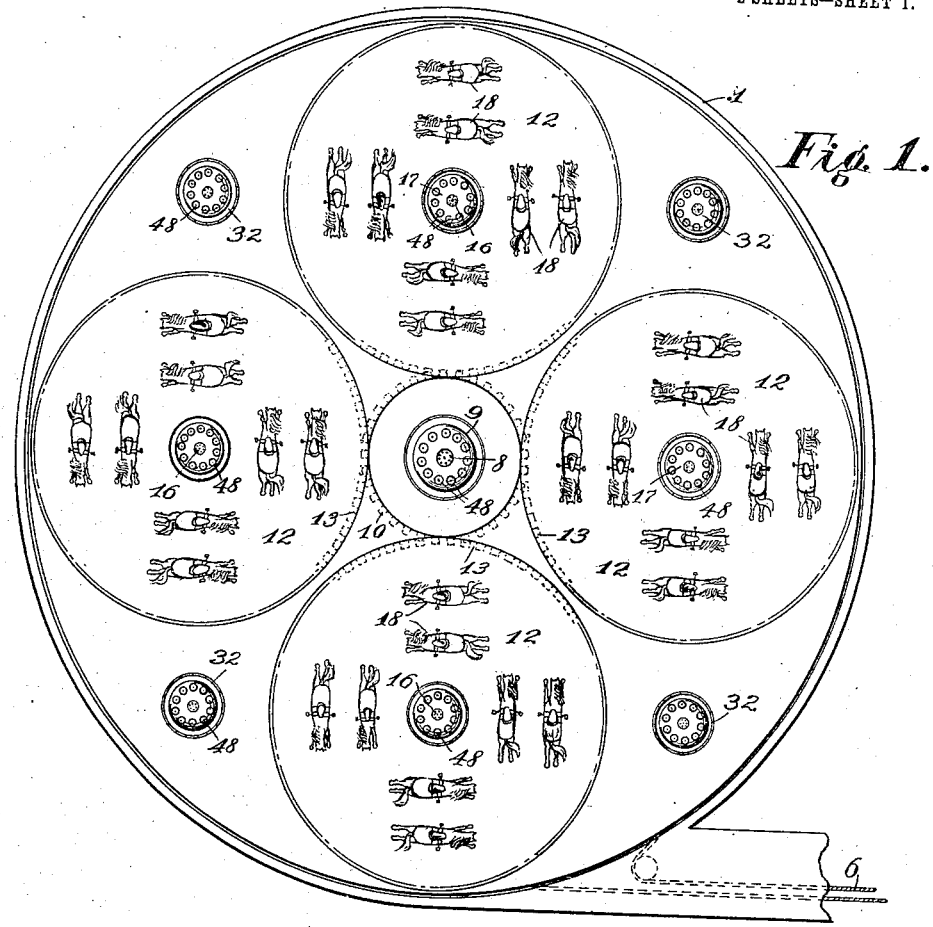

W. J. McLEVIE.
MERRY-GO-ROUND.
APPLICATION FILED APR. 15, 1909.

966,229.

Patented Aug. 2, 1910.

2 SHEETS—SHEET 1.

Witnesses:
Nathan F. Fretter.
Brennan B. West.

Inventor.
Wm. J. McLevie
By Bates, Fouts & Hull
Attys

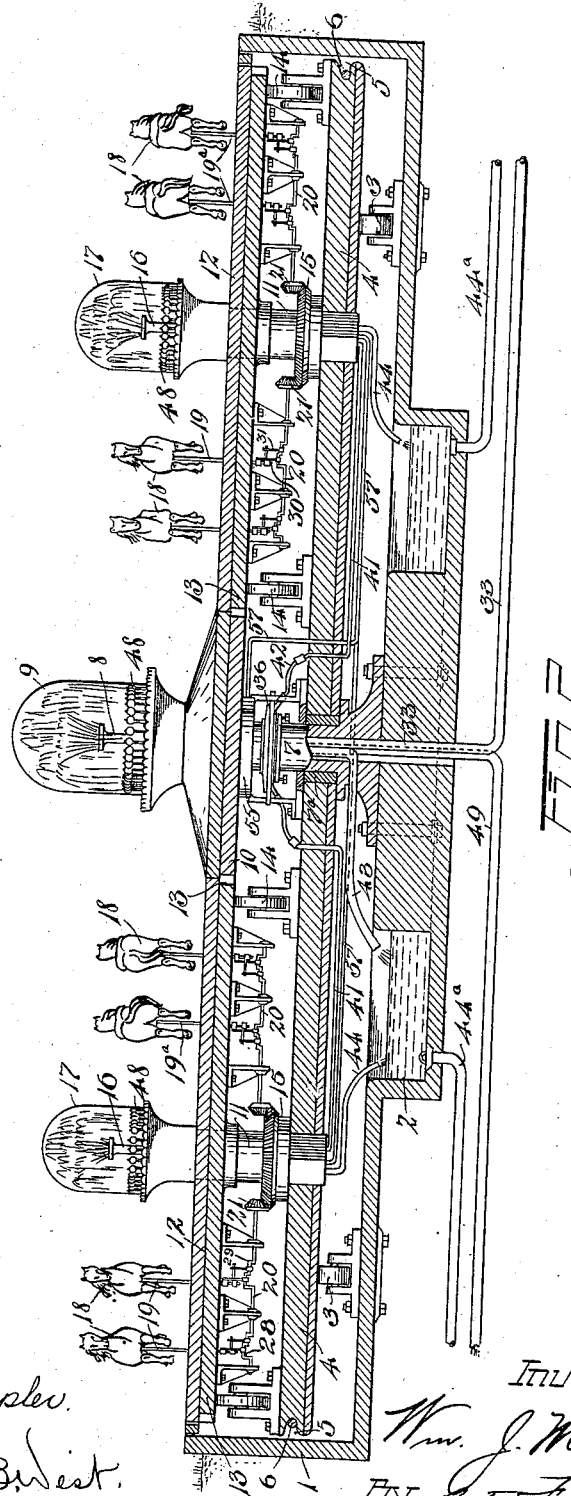

UNITED STATES PATENT OFFICE.

WILLIAM J. McLEVIE, OF EUCLID BEACH, OHIO.

MERRY-GO-ROUND.

966,229.  Specification of Letters Patent.  Patented Aug. 2, 1910.

Application filed April 15, 1909. Serial No. 490,193.

*To all whom it may concern:*

Be it known that I, WILLIAM J. McLEVIE, a citizen of the United States, residing at Euclid Beach, in the county of Cuyahoga and State of Ohio, have invented a certain new and useful Improvement in Merry-Go-Rounds, of which the following is a full, clear, and exact description, reference being had to the accompanying drawings.

This invention relates to pleasure apparatus of the class known as "carousels", "merry-go-rounds" or "roundabouts", and has for its object to produce a device of this class wherein the seats, especially those in the forms of animals, may be given a motion simulating that made by a horse or other animal in leaping an obstruction; also to provide an apparatus of this character with improved driving mechanism whereby auxiliary platforms are rotated by the rotation imparted to the main platform; also to provide a device of this character with electric, or illuminated, fountains having efficient means for supplying water and electric current thereto during the rotation of the main and auxiliary platforms.

Generally speaking, the invention may be defined as consisting of the combinations of elements embodied in the claims hereto annexed and illustrated in the drawings forming part hereof, wherein—

Figure 3:
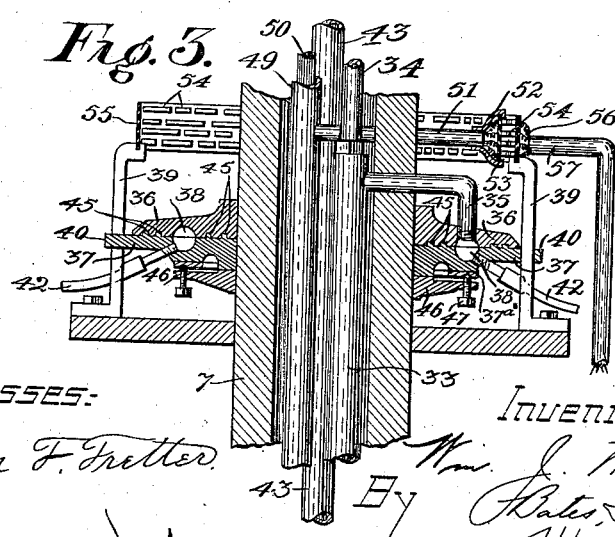

Figure 1 represents a plan view of a pleasure apparatus constructed in accordance with my invention; Fig. 2, a central sectional view taken through the apparatus shown in Fig. 1; and Fig. 3 an enlarged sectional detail of the central portion of the apparatus, illustrating the manner in which water and electric current may be supplied thereto for the purpose of distributing the water to the various fountains and the electric current to various groups of lights in said fountains to produce varying and pleasing effects therein.

Describing the parts by reference characters, 1 denotes a casing, which is preferably cylindrical in form and has an open top and a closed bottom provided with an annular trough 2 between the center and the periphery thereof. Outside of the trough, the bottom of the casing is provided with a plurality of rollers 3 for the support of the main platform 4.

The main platform is circular in shape and fits within the up-standing outer wall of casing 1 and is provided with a peripheral groove 5 for the reception of the belt 6, by means of which it is rotated. This belt may be led to any convenient power-driven pulley (not shown) whereby the platform may be rotated within the casing. The central portion of the platform is sleeved upon a bushing 7ª on a hollow post 7, having at its upper end a fountain comprising a jet 8 and a casing 9 of transparent material, as glass. Below the fountain, the post 7 is provided with a gear 10 rigid therewith.

Between the center and periphery of the platform there are provided a suitable number of upwardly projecting hollow posts 11, each having rotatably mounted thereon a platform 12, each platform being provided with a gear 13 at the peripheral edge thereof meshing with the central gear 10. The platforms 12 and gear 10 are all preferably arranged below the top of the casing 1, and the platforms 12 are interposed between the central gear and fountain and the inner periphery of casing 1. Platforms 12 are rotatably supported on rollers 14 carried by the platform 4. The lower ends of the posts 11 are non-rotatably supported by the platform 4, and each is provided above such platform with a non-rotatable beveled gear 15. Each of the auxiliary platforms 12 is provided with a fountain comprising a jet 16 and an inclosing transparent casing 17, and each auxiliary platform is also provided with a plurality of seats, shown in the form of horses 18, said horses being reciprocated by means of rods 19 and 19ª extending through the auxiliary platforms and connected at their lower ends to crank shafts 20. These crank shafts are preferably radially arranged with respect to each auxiliary platform and each has at its inner end a beveled pinion 21 meshing with the beveled gear 15.

In the drawings, two seats, in the form of horses, are shown connected with each crank shaft. By reason of the peculiar construction of the crank shaft and the connections between the same and each seat, the latter is caused to assume successively the positions taken by a horse in leaping an obstacle.

The crank shaft 20 is provided with a pair of cranks for each horse, said cranks being shown respectively at 28 and 29. The crank 28 is offset further from the main line of the crank shaft than the crank 29 and is connected with the rod 19 by means of a link 30, while the crank 29 is connected with the rod 19ª by means of the link 31. Both the cranks 28 and 29 project in the same direction from the crank 20. As the cranks ascend, by rotation of the crank shaft 20, the longer crank 28 will elevate the front end of the horse faster than the shorter crank will elevate the rear end. This lifts the front of the horse in the manner that would be assumed in taking a leap. As the cranks descend to a horizontal position on the other side, the front end of the horse descends until the horse is level. As the cranks pass around the lower center, the front end of the horse is depressed faster than the rear end and the horse assumes the positions that would be assumed in finishing a leap.

With the parts arranged as thus far described, it will be apparent that, by driving the belt 6, the main platform 4 will be rotated, carrying with it the posts 11 on which the auxiliary platforms 12 are supported and these platforms, through the intermeshing of their gears with gear 10, will be rotated on the posts 11 during their planetary course about the central gear and fountain. The rotation of the auxiliary platforms about their own centers causes the beveled pinions 21 to be driven from the bevel gears 15, rotating the crank shafts 20 and operating the seats or horses in the manner described.

In addition to the central fountain and the fountains carried by the auxiliary platforms, any suitable number of additional fountains 32 may be provided, such fountains being shown as being located between the auxiliary platforms.

For the purpose of supplying water continuously to the fountains, the following construction is provided. A water supply pipe 33 extends upward through the central bore of the post 7. This pipe is provided with two branches, one branch 34 leading upward to the jet 8 and the other branch 35 leading to a distributing ring, provided with branch supply pipes leading to the other fountains. This distributing ring is formed in two members 36 and 37, half the ring being formed in one of said members and the other half in the other member, the ring being shown at 38. The member 36 is rigid with the post 7, while the member 37 is rotatable and adjustable with respect to said post, being driven from the main platform by means of arms 39 projecting upwardly therefrom and engaging projections 40 on the member 37.

41 denotes supply pipes leading to the auxiliary fountains. Each of these pipes is connected to the member 37 and ring 38 by means of a flexible connection 42.

The central fountain is provided with a drain pipe 43 discharging into the trough 2, said drain pipe extending downwardly through the post 7. Similar drain pipes 44 extend downwardly from the hollow post 11 of each of the fountains carried by the auxiliary platform 12. Each fountain 32 will be provided with a supply and drain pipe similar to those with which each of the auxiliary platform fountains is provided, and pipes 44ª serve to drain the trough 2.

For the purpose of preserving a water tight joint between the sections or members 36 and 37, said sections are provided with joints located externally and internally with respect to the ring 38, said joints being provided by rings 45 carried by the section 37 and interlocking with similar grooves in the section 36. The section 37 is supported from a ring 46 secured to the post 7 and having screws 47 extending therethrough and engaging a ring 37ª on the section 37. By the adjustment of said screws, a water tight joint may be preserved between sections 36 and 37 while section 37 is free to turn on the ring 37ª.

For the purpose of illuminating the various fountains during the operation of rotating the merry-go-round, each of these fountains will be provided with sets of incandescent lights 48, each fountain having bulbs of varying colors. To supply current to the different combinations of lights in the different fountains during the rotation of the merry-go-round, I extend the cable 49 up through the central hollow post 7. Some of the strands 50 of said cable are led to the lights in the central fountain while other strands are led by the branch cable 51 to an insulating block 52 having a series of brushes 53. These brushes are adapted to coöperate with contacts 54 carried by a ring 55, which in turn may be conveniently supported on the upper ends of the arms 39. These contacts are arranged in separated groups corresponding to groups of lights in the fountains. For instance, one group of contacts will have all the red lights connected thereto; another, all the blue lights connected thereto, and so on. The contacts 54 are provided with conductors 56 which are formed into cables 57, one for each of the auxiliary fountains carried by the platform 5. Each of the cables 57 extends upwardly through a hollow post 11 to the lights 48 in such auxiliary fountains.

From the foregoing description, the operation will be clear. As the main platform is driven by its belt, it carries with it the auxiliary platforms 12 which are rotated by the engagement of their gears with the central gear 10. This rotation of the auxiliary platforms causes the crank shafts 20 to be revolved to raise and lower the horses in the peculiar manner described, causing them to simulate a leaping action. This rotation of the main and auxiliary platforms does not interfere with the supply of water to the central and auxiliary fountains, owing to the peculiar construction for supplying the water thereto. By suitably grouping the colored lamps in the fountains and similarly arranging the contacts on the ring 55, any combinations of colored lights that may be desirable may be accomplished as the main platform rotates.

Having thus described my invention, what I claim is:

1. In an apparatus of the character set forth, the combination of an annular trough, a platform rotatably mounted above said trough and having a plurality of fountains each provided with a drain pipe adapted to discharge into said trough, a central fountain carried by said platform, and supply connections leading from said central fountain to the auxiliary fountains.

2. In an apparatus of the character set forth, the combination, with a plurality of fountains, of means for revolving said fountains planetarily, and means for supplying water to said fountains, said means comprising a pair of members having a supply channel formed therewith, connections extending from said channel to said fountains, and means whereby one of said members may be adjusted toward and from the other.

3. In an apparatus of the character set forth, the combination, with a plurality of fountains, of means for revolving said fountains planetarily, and means for supplying water to said fountains, said means comprising a centrally arranged pair of members each having a fractional supply channel formed therewith, connections extending from one of said fractional channels to said fountains, and means whereby the member containing the last-mentioned channel may be rotated.

4. In an apparatus of the character set forth, the combination, with a plurality of fountains, of means for revolving the same planetarily, means for supplying water to said fountains, said means comprising a pair of members located centrally with respect to said fountains and each having therein an annular groove arranged to form a complete distributing groove when said members are in operative relation to each other, said members being provided with interlocking rings and grooves arranged internally and externally with respect to said annular grooves, and means for adjusting said members toward and from each other.

5. In an apparatus of the character set forth, the combination of a central post, fountains arranged externally of said post, means for supplying water to said fountains, said means comprising a pair of members each having a fractional supply recess therein and arranged to be brought together to form a complete supply recess, pipes leading from such recess to said fountains, a supporting member for the lower supply member, said supporting member being carried by said central post, adjusting means carried by the supporting member and arranged to engage the adjacent supply member and adjust the same with reference to the other supply member, and means for revolving the fountains planetarily about said post.

6. In an apparatus of the character set forth, the combination of a central post, fountains arranged externally of said post, means for supplying water to said fountains, said means comprising an upper and a lower member each having a fractional supply recess therein and arranged to be brought together to form a complete supply recess, the upper member being rigid with said post, pipes leading from the recess in the lower member to said fountains, a supporting member for the lower supply member, said supporting member being carried by said central post, a plate engaging the lower member, screws extending from the supporting member and engaging said plate, and means for rotating the fountains planetarily about said post.

7. In an apparatus of the character set forth, the combination of a plurality of electric fountains each having a plurality of lights therein, means for revolving said fountains planetarily, and means operated by the revolution of said fountains for varying the lighting of each fountain.

8. In an apparatus of the character set forth, the combination of a plurality of illuminated fountains each having lighting means, means for revolving said fountains planetarily, and means operated by the revolution of said fountains for varying the lighting effect in each fountain.

9. In an apparatus of the character set forth, the combination of a plurality of electric fountains each having a plurality of electric lights therein, means for rotating said fountains planetarily, a central switch device, conductors leading from said device to the lamps in each fountain, and means operative by the rotation of said fountains for operating said switch.

10. In an apparatus of the character set forth, the combination of a platform, a plurality of electric fountains carried thereby, incandescent lamps carried by each of said fountains, means for rotating said platform, a contact ring rotatable with said platform and having a plurality of contacts thereon, a plurality of conductors extending from said ring to each of said fountains, a central fixed switch device having a plurality of contacts arranged to engage the contacts on the ring successively, and means for supplying current to said switch device.

11. In an apparatus of the character set forth, the combination, with a central fountain having a plurality of lights therein and a plurality of fountains arranged externally of the first mentioned fountain and having each a plurality of lights therein, of means for rotating the latter fountains planetarily around the former, means for supplying water to all of said fountains during such rotation, and means for automatically varying the lighting effect in each fountain during such rotation.

12. In an apparatus of the character set forth, the combination of a receptacle, a platform, a plurality of fountains carried by said platform, means for supplying water to each of said fountains, a drain pipe for each fountain arranged to discharge into said receptacle, and means for rotating said platform.

13. In an apparatus of the character set forth, the combination of a receptacle, a platform having a plurality of auxiliary fountains each provided with a drain pipe adapted to discharge into said receptacle, a central fountain carried by said platform, and supply connections leading from the central fountain to the auxiliary fountains.

14. In an apparatus of the character set forth, the combination of a platform having a central fountain and auxiliary fountains, means for rotating said platform, connections for rotating the auxiliary fountains during the rotation of the platform, means for supplying water to the central fountain, connections for supplying water from the central fountain to the auxiliary fountains, and draining means for all of said fountains.

15. In an apparatus of the character set forth, the combination of a plurality of fountains, a platform carrying the same, means for rotating said platform, a liquid supply located near the center of the platform, connections leading from said supply to the fountains, a receptacle, and drain pipes leading from the fountains to said receptacle.

16. In an apparatus of the character set forth, the combination of a platform, means for rotating the same, a plurality of fountains carried by said platform, a centrally located rotatable water supply element, and supply pipes leading from said rotatable element to said fountains.

17. In an apparatus of the character set forth, the combination of a main platform, a fixed gear arranged centrally with respect to said platform and above the same, a fountain above said gear, a series of auxiliary platforms above the main platform and each having a gear arranged to mesh with the fixed central gear, a fountain carried by each of the auxiliary platforms and means for supplying water to all of said fountains.

18. In an apparatus of the character described, the combination of a central post, a main platform rotatably mounted on said post, a gear rigid with said post, a fountain carried by said post, posts carried by said platform, an auxiliary platform on each of the latter posts, a fountain carried by each auxiliary platform, and each of the latter platforms having a gear arranged to mesh with the gear on the central post.

19. In an apparatus of the character set forth, the combination of a central post, a main platform rotatably mounted on said post, a gear rigid with said post, auxiliary platforms carried by the main platform and each having a gear arranged to mesh with the gear on the central post, a fountain on each of the said auxiliary platforms, and connections for supplying water to said fountains.

In testimony whereof, I hereunto affix my signature in the presence of two witnesses.

WILLIAM J. McLEVIE.

Witnesses:
J. B. HULL,
CURT B. MUELLER.